US008593346B2

(12) United States Patent
Suzuki

(10) Patent No.: US 8,593,346 B2
(45) Date of Patent: Nov. 26, 2013

(54) POSITIONING APPARATUS

(75) Inventor: Mitsuru Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 316 days.

(21) Appl. No.: 13/023,131

(22) Filed: Feb. 8, 2011

(65) Prior Publication Data

US 2011/0215967 A1 Sep. 8, 2011

(30) Foreign Application Priority Data

Mar. 4, 2010 (JP) ................................. 2010-47728

(51) Int. Cl.
*G01S 19/33* (2010.01)
*G01S 19/29* (2010.01)
*G01S 19/37* (2010.01)

(52) U.S. Cl.
CPC ................. *G01S 19/33* (2013.01); *G01S 19/29* (2013.01); *G01S 19/37* (2013.01)
USPC ................................. 342/357.77; 342/357.68

(58) Field of Classification Search
CPC ......... G01S 19/33; G01S 19/36; G01S 19/37; G01S 19/23
USPC .............. 342/357.73, 357.76, 357.77, 357.68
See application file for complete search history.

(56) References Cited

U.S. PATENT DOCUMENTS

| | | | |
|---|---|---|---|
| 5,923,287 A * | 7/1999 | Lennen | 342/357.73 |
| 6,363,123 B1 | 3/2002 | Balodis | |
| 6,509,870 B1 | 1/2003 | Matsushita et al. | |
| 6,608,998 B1 * | 8/2003 | Neumann et al. | 455/296 |
| 7,358,896 B2 | 4/2008 | Gradincic et al. | |
| 7,764,226 B1 * | 7/2010 | Veitsel et al. | 342/357.73 |
| 7,859,454 B2 * | 12/2010 | Abraham | 342/357.62 |
| 7,929,928 B2 | 4/2011 | Babitch et al. | |
| 2003/0108126 A1 * | 6/2003 | Akopian | 375/326 |
| 2007/0253471 A1 | 11/2007 | Wilhelmsson et al. | |
| 2010/0127925 A1 * | 5/2010 | Conroy et al. | 342/357.09 |
| 2010/0141519 A1 * | 6/2010 | Rodal | 342/357.12 |

FOREIGN PATENT DOCUMENTS

| | | |
|---|---|---|
| JP | A-S61-198074 | 9/1986 |
| JP | A-S63-006479 | 1/1988 |
| JP | A-63-308587 | 12/1988 |
| JP | A-4-278723 | 10/1992 |
| JP | A-H05-281330 | 10/1993 |
| JP | A-6-242208 | 9/1994 |
| JP | A-6-265625 | 9/1994 |
| JP | A-7-128423 | 5/1995 |
| JP | A-7-218612 | 8/1995 |
| JP | A-8-271606 | 10/1996 |

(Continued)

OTHER PUBLICATIONS

Office Action dated Apr. 17, 2012 in corresponding RU Application No. 2011108300 (and English translation).

(Continued)

*Primary Examiner* — Gregory C Issing
(74) *Attorney, Agent, or Firm* — Posz Law Group, PLC

(57) ABSTRACT

A positioning apparatus calculates an offset frequency of a local oscillator based on position information which is positioned, satellite position information acquired from a satellite signal of a GPS satellite, and a velocity vector of a GPS satellite. A GLONASS function is operated based on the offset frequency; then, positioning is carried out by the GPS function and the GLONASS function.

4 Claims, 6 Drawing Sheets

(56) References Cited

FOREIGN PATENT DOCUMENTS

| JP | A-11-109016 | 4/1999 |
|----|-------------|--------|
| JP | A-2001-305213 | 10/2001 |
| JP | A-2004-317175 | 11/2004 |
| JP | A-2006-184219 | 7/2006 |
| RU | 2152625 C1 | 7/2000 |
| RU | 2318221 C1 | 2/2008 |

OTHER PUBLICATIONS

Decision on Grant dated Sep. 12, 2012 in a corresponding Russian Application No. 2011108300 (and English translation).
Office Action mailed Mar. 12, 2013 in corresponding JP Application No. 2010-047728 (and English translation).

\* cited by examiner

POSITIONING APPARATUS

CROSS REFERENCE TO RELATED APPLICATION

The present application is based on and incorporates herein by reference Japanese Patent Application No. 2010-47728 filed on Mar. 4, 2010.

FIELD OF THE INVENTION

The present invention relates to a positioning apparatus, which acquires satellite signals from a GPS (Global Positioning System) satellite and a GLONASS (GLobal Orbiting NAvigation Satellite System) satellite, thereby performing positioning.

BACKGROUND OF THE INVENTION

[Patent document 1] JP-2006-184219 A
[Patent document 2] JP-H7-128423 A
[Patent document 3] JP-2007-159106 A (U.S. Pat. No. 7,358,896 B2)

For example, a GPS receiver is provided which receives a satellite signal from a GPS satellite to perform positioning (for example, refer to Patent document 1). According to the technical idea described in Patent document 1, when acquiring a satellite signal from a GPS satellite, a temperature compensation oscillator is used as a transmission source of a reference frequency of an oscillator. A frequency offset is amended by using the temperature compensation crystal oscillator as a local oscillator; a GPS signal is received.

Further, a GLONASS receiver is provided. The GLONASS system includes 24 satellites. Herein, 21 of them transmit satellite signals at present; the satellite signals are received by a receiver, performing positioning. A reception apparatus which is shared between the GPS and the GLONASS is developed (for example, refer to Patent document 2). According to the technical idea described in Patent document 2, a frequency conversion from RF to IF is realized using a single mixed means (mixer etc.); components, which have an image relation from a viewpoint of a frequency of a local oscillated signal, are mutually separated from a mixed signal to output, intending to eliminate interference with a positioning signal concerning each positioning system.

According to the technical idea described in Patent document 3, a multi-band receiver for global positioning system satellite system (GNSS) is provided to be a system which uses, in an integrated manner, Global Positioning System (GPS) employed in the U.S., Global Navigation Satellite System (GLONASS) employed in the Russian Federation, and Galileo Positioning System made by the European Union.

When intending to make the positioning function highly precise by combining the function of a GPS receiver and the function of a GLONASS receiver, a positioning is performed by acquiring the satellite signals of both the functions using the oscillated frequency which the local oscillator oscillates. However, the inventor confirms that even in such a positioning, both of the functions cannot be operated favorable.

SUMMARY OF THE INVENTION

The present invention is made in view of the above situation. It is an object to provide a positioning apparatus, which makes a positioning function operate favorable even under a configuration where a local oscillator is shared between a GPS function and a GLONASS function.

To achieve the above object, according to an example of the present invention, a positioning apparatus is provided as follows. The apparatus has a GPS function receiving a satellite signal from a GPS satellite and a GLONASS function receiving a satellite signal from a GLONASS satellite. A local oscillator is included which generates an oscillated frequency, wherein the GPS function demodulates the satellite signal with the oscillated frequency to execute a positioning, and the GLONASS function demodulates the satellite signal with the oscillated frequency to execute a positioning. A positioning computation section is included which computes an offset frequency of the local oscillator based on position information which is positioned, satellite position information acquired from a satellite signal of a GPS satellite, and a velocity vector of a GPS satellite, causes the GLONASS function to operate based on the offset frequency, and executes a positioning using the GPS function and the GLONASS function.

In this case, in conjunction with an influence of an environmental temperature change etc., when the local oscillator oscillates several oscillated frequencies of the GLONASS function, for instance, there may be produced a deviation from an intended oscillated frequency. In contrast, an offset frequency of a local oscillator is calculated based on position information which is positioned, satellite position information acquired from a satellite signal of a GPS satellite, and a velocity vector of a GPS satellite; the GLONASS function is operated based on the offset frequency, performing a positioning using the GPS function and the GLONASS function. Thus, the deviation comes to be compensated even if the deviation occurs in the oscillated frequency of the local oscillator. Both the GPS function and the GLONASS function operate favorable. Under this configuration, even when a positioning apparatus shares a local oscillator between a GPS function and a GLONASS function, the positioning function is made to operate favorable.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
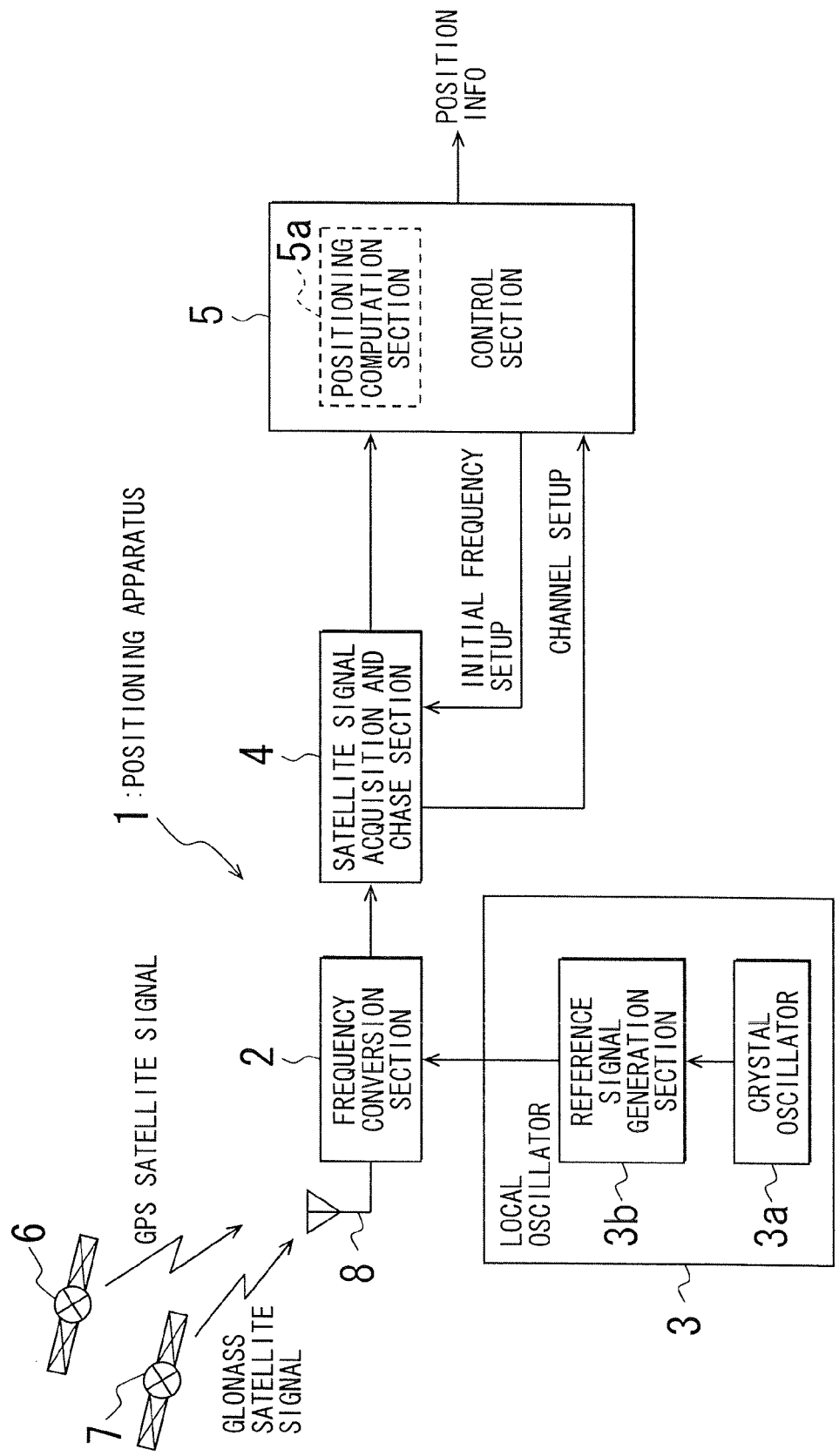
FIG. 1 is a diagram of an electrical configuration schematically illustrating a positioning apparatus in a first embodiment of the present invention.

The following explains a first embodiment of the present invention with reference to FIGS. 1 to 5. FIG. 1 illustrates schematically a block diagram regarding an electrical configuration of a positioning apparatus. As illustrated in FIG. 1, the positioning apparatus 1 includes a frequency conversion section 2, a local oscillator 3, a satellite signal acquisition and chase section 4, and a control section 5. The control section 5 outputs position information to an outside (for example, display device (not shown)).

The local oscillator 3 includes a crystal oscillator 3a, for example. This crystal oscillator 3a is a vibrator which includes an oscillator having a reference frequency of 16.368 [MHz], for example. Based on the reference frequency of the crystal oscillator 3a, the reference signal generation section 3b generates an oscillated frequency signal of the local oscillator 3. The reference signal generation section 3b includes a multiplication circuit which carries out N multiplication of the reference frequency of the crystal oscillator 3a, and outputs it. The number of the multiplication N is set fixedly according to each of the GPS satellite system and the GLONASS satellite system. For example, 96 is set for the GPS satellite system; 98 is set for the GLONASS satellite system.

The oscillation signal of the local oscillator 3 is given to the frequency conversion section 2. This frequency conversion section 2 receives satellite signals via the antenna 8 from a GPS satellite 6 and a GLONASS satellite 7. The frequency conversion section 2 applies a down conversion to a satellite signal using the oscillated frequency within a first frequency band or a second frequency band other than the first frequency band, the first and second frequency bands which the local oscillator 3 oscillates, amplifying the satellite signals post-down conversion in an amplifier, which is unshown.

The satellite signal acquisition and chase section 4 acquires and chases an IF signal of satellite after the down conversion to the GPS satellite signal or GLONASS satellite signal by applying the numerical control frequency oscillator 4a. The control section 5 includes, for example, a device such as a microcomputer. The control section 5 is equipped with a positioning computation section 5a to execute a positioning computation based on signals acquired by the satellite signal acquisition and chase section 4 and outputs the position information.

Figure 2:
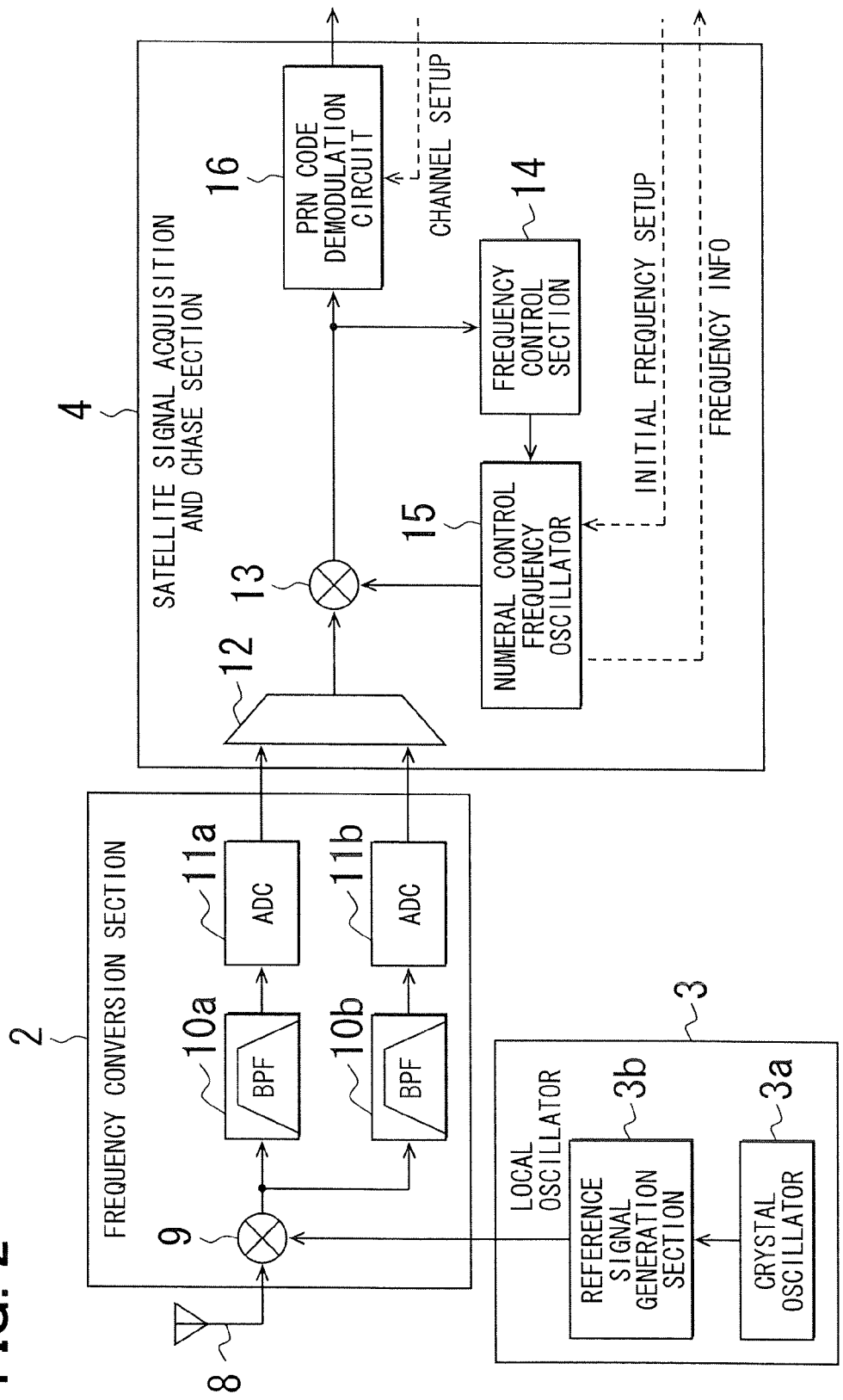
FIG. 2 is a diagram illustrating a detailed configuration example of a frequency conversion section and a satellite signal acquisition and chase section.

FIG. 2 is a diagram illustrating a detailed configuration example of a frequency conversion section and a satellite signal acquisition and chase section. As illustrated in FIG. 2, the frequency conversion section 2 includes a mixer 9, band pass filters 10a, 10b, and A/D. converters 11a, 11b. The mixer 9 and band pass filters 10a, 10b form an analog circuit, an output of which is connected with the A/D converters 11a, 11b. The mixer 9 executes a down conversion according to an oscillated frequency of the local oscillator 3, to thereby change into an IF signal of an intermediate frequency band, and output the IF signal to the band pass filters 10a, 10b.

<GPS Satellite System>

Figure 3:
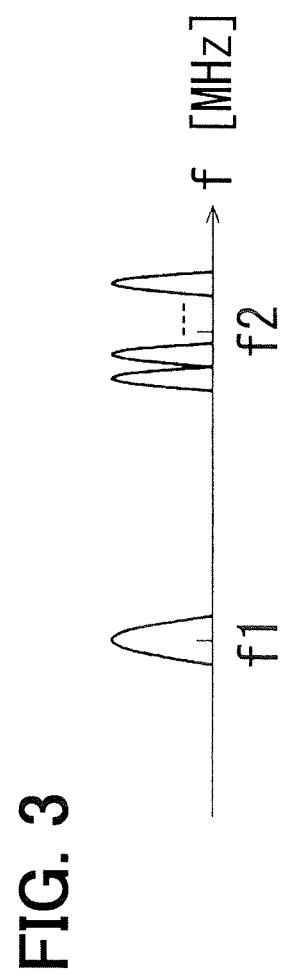
FIG. 3 is a diagram of a frequency allocation of satellite signals.

FIG. 3 indicates schematically a frequency allocation diagram of each satellite signal. Any one of the GPS satellites 6 has a carrier frequency of the GPS satellite signal of 1575.42 MHz which belongs to an L band. The GPS satellite signals are in the multiplex diffusion within a frequency range (first frequency range) of about 2 MHz while centering on carrier frequency by executing a spectrum spread modulation of the CDMA system. In the GPS satellite system, the frequency deviation may arise largely by applying the crystal oscillator 3a as a transmission source of a reference frequency of the local oscillator 3. Even in such a case, the CDMA is applied as multiplex mode; thus, the GPS satellite signals can be demodulated sufficiently.

In the system using the GPS satellites 6, the positioning can be achieved by acquiring at least four satellites. The GPS covers the whole of the earth by using 24 satellites. At least four satellites can be acquired in the area where no obstacle exists up (for example, the area where buildings are not densely existing). However, four satellites cannot be easily acquired in the area where buildings are densely existing such as a center of a city. Thus, only using the GPS system results in increase of the positioning error or leap of positions.

<GLONASS Satellite System>

As illustrated in FIG. 3, the carrier frequency of the GLONASS satellite signal is set such that respective channels have different frequencies within a frequency range (second frequency range) of about 1598 to 1605 [MHz] belonging to an L band. The carrier frequencies of the GLONASS satellites 7 differ from each other; the positioning apparatus 1 receives signals using the FDMA manner. Each GLONASS satellite 7 transmits a satellite signal in each frequency which is divided into twelve channels.

The bandwidth of the GLONASS signal to which the spectrum spread is applied is about 1 MHz. The positioning apparatus 1 acquires a carrier according to each carrier frequency of several GLONASS satellites 7. Under the configuration of the present embodiment, the numerical control frequency oscillator 15 of the satellite signal acquisition and chase section 4 stipulates an oscillated frequency according to the carrier frequency of a GLONASS satellite 7.

The GLONASS satellite system serves as a full operation in and after 2010. Such GLONASS satellite system may be combined with the GPS satellite system; thereby, the number of satellites in the center of a city which are acquired can be increased. Thereby, acquisition of four or more satellites can be always realized; and dissolution of a positioning error or a leap of positions can be aimed at.

The oscillated frequency which the local oscillator 3 oscillates is set such that the carrier frequency of the GPS satellite signal and the carrier frequency of the GLONASS satellite signal have an image relation from a viewpoint of the oscillated frequency. Signals that the mixer 9 mixes are set to be different from each other in respect of frequency bands. The band pass filter 10a is configured to be a filter, which passes the frequency band within the frequency range after down-converting the GPS satellite signal and attenuates the other frequency signals.

In contrast, the band pass filter 10b is configured to be a filter, which passes the frequency band within the frequency range after down-converting the GLONASS satellite signal and attenuates the other frequency signals.

The outputs of the band pass filters 10a, 10b are given to the A/D converters 11a, 11b, respectively. The A/D converter 11a carries out an A/D conversion of the IF signal of the intermediate frequency band of the GPS satellite signal, and outputs it to the satellite signal acquisition and chase section 4. The A/D converter 11b carries out an A/D conversion of the IF signal of the intermediate frequency band of the GLONASS satellite signal, and outputs it to the satellite signal acquisition and chase section 4.

The satellite signal acquisition and chase section 4 includes a selector 12, a mixer 13, a frequency control section 14, a numerical control frequency oscillator 15, and a PRN (Pseudo Random Noise) code demodulation circuit 16, which are connected. The selector 12 chooses one of the outputs of the A/D converters 11a, 11b, and gives it to the mixer 13. The mixer 13 executes a carrier elimination process about the IF signal of an intermediate frequency band based on the output of the numerical control frequency oscillator 15 (NCO: Numerical Controlled Oscillator).

The numerical control frequency oscillator 15 oscillates a sine wave of a frequency according to a set-up value when the set-up value is given by the control section 5. When a frequency to search for a GPS satellite signal is designated from the control section 5, the frequency according to the set-up value is oscillated and outputted to the mixer 13. When an initial frequency to search for a GLONASS satellite signal and a channel of the GLONASS satellite 7 are set from the control section 5, the numerical control frequency oscillator 15 oscillates a frequency according to the set-up value (frequency of the search frequency range, which is mentioned later) and outputs it to the mixer 13. The information on the outputted frequency is also given to the control section 5.

The output signal of the mixer 13 is given to the frequency control section 14. The frequency control section 14 feeds back the output signal to the numerical control frequency oscillator 15; thereby, the mixer 13 can further carry out an elimination process to the above-mentioned IF signal. Thereby, only a signal component can be outputted to the PRN code demodulation circuit 16.

Thus, the output signal of the mixer 13 obtained by the feeding back is given to the PRN code demodulation circuit 16. The PRN code demodulation circuit 16 is a demodulation circuit, which uses a pseudo random code (PRN code), to demodulate based on the pseudo random code. In the GPS satellite signals, different unique PRN codes (false random noise codes) are respectively designated to the several GPS satellites 6. The positioning apparatus 1 generates the PRN code responding to each GPS satellite 6, and demodulates the signal with the spectrum reverse diffusion using the PRN code.

In contrast, in the GLONASS satellites 7, the identical PRN code is used for any one of the GLONASS satellites 7; the signal is demodulated with the spectrum reverse diffusion using the identical PRN code common for each satellite 7. Then, since the local oscillator 3 oscillates using the crystal oscillator 3a, the frequency deviation about ±30 [ppm] is produced. The increase of the frequency deviation leads to a delay in the search time of the GPS satellite positioning, and a channel erroneous recognition of the GLONASS satellite 7. In the present embodiment, when the positioning is executed using the GPS function, an offset frequency of the crystal oscillator 3a is computed, and the satellite positioning is then executed using the GLONASS function based on the computed offset frequency. The following explains a relation between the oscillated frequency of the local oscillator 3 and the offset frequency when carrying out the down conversion of the GPS satellite signal.

A formula (1) indicates a relation among a GPS frequency, an oscillated frequency of the local oscillator 3, and an oscillated frequency of the numerical control oscillator 14.

$$\text{GPS frequency} + \text{DOP}_{sate} + \text{Dop}_{rec} = (\text{reference frequency} + \text{offset frequency}) \times N(\text{fixed value}) + (\text{frequency of the numerical control oscillator}) \quad (1)$$

Herein, $\text{Dop}_{sate}$ and $\text{Dop}_{rec}$ indicate an amendment value set up uniquely for each GPS satellite 6 based on the Doppler frequency, and an amendment value based on the Doppler frequency of the positioning apparatus 1, respectively. Moreover, the reference frequency is a unique oscillated frequency to the crystal oscillator 3a; for example, 16.384 MHz is set. The oscillated frequency of the local oscillator 3 is a value in consideration of the offset frequency of the crystal oscillator 3a; the frequency is obtained by multiplying the oscillated frequency of the crystal oscillator 3a N times (refer to the first item of formula (1)). The amendment value $\text{Dop}_{sate}$ based on the Doppler frequency can be computed with three elements of an arrangement position of the positioning apparatus 1, a satellite position of the GPS satellite 6, and a satellite velocity vector of the GPS satellite 6.

Out of the three elements, the arrangement position of the positioning apparatus 1 can be computed such that positioning operation data after acquisition of the GPS satellite 6 is referred to and the referred operation data is used for the computing. Moreover, the position of the GPS satellite 6 is included in data after the demodulation applied to the satellite signal. Moreover, the satellite velocity vector can be computed using track information included in the received data.

When a theoretical GPS carrier frequency and the value of $\text{Dop}_{sate}$ are set, Doprec can be computed by subtracting the theoretical GPS frequency and $\text{Dop}_{sate}$ from the frequency of the received GPS satellite signal. The theoretical GPS carrier frequency is 1575.42 [MHz]; thus, $$1575.42[\text{MHz}] + \text{Dop}_{sate} \text{Dop}_{rec} = (16.368[\text{MHz}] + \text{offset frequency}) \times 96 + (\text{oscillated frequency of the numerical control frequency oscillator 14}) \quad (2)$$

Herein, the GPS satellite signal can be acquired when the oscillated frequency of the numerical control frequency oscillator 15 is set at 4,084,000 [Hz]. For instance, based on the positioning computation result after acquisition of four satellites, $\text{Dop}_{sate}$–10 [kHz] and $\text{Dop}_{rec}$=0 are obtained. In this case, the offset frequency can be computed to be about 20.83 [Hz] as a value with which the left side and the right side of formula (2) agree with each other.

Figure 4:
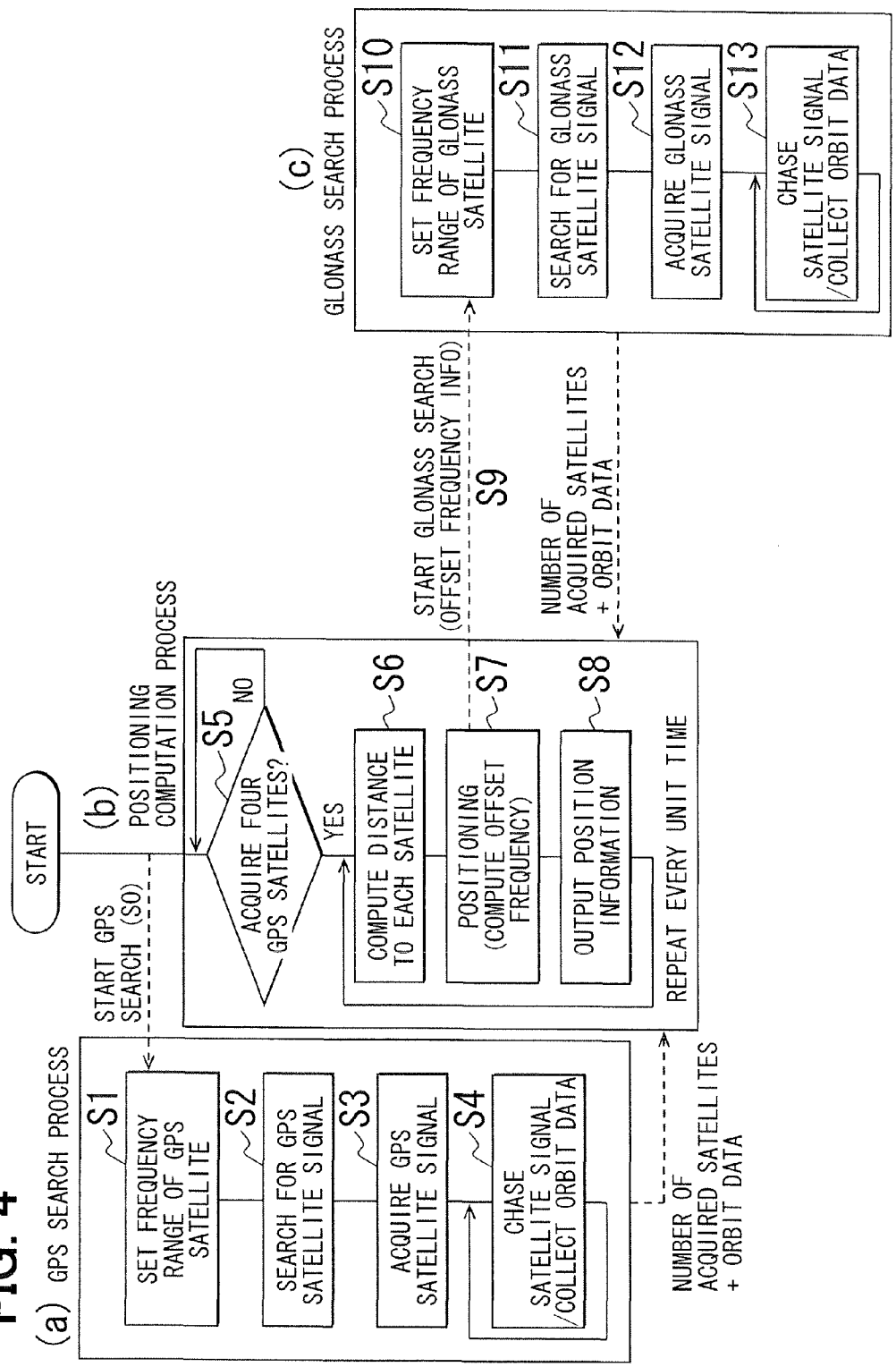
FIG. 4 is a flowchart schematically illustrating an operation taking place when a determined position of the positioning apparatus cannot be understood.
Figure 5:
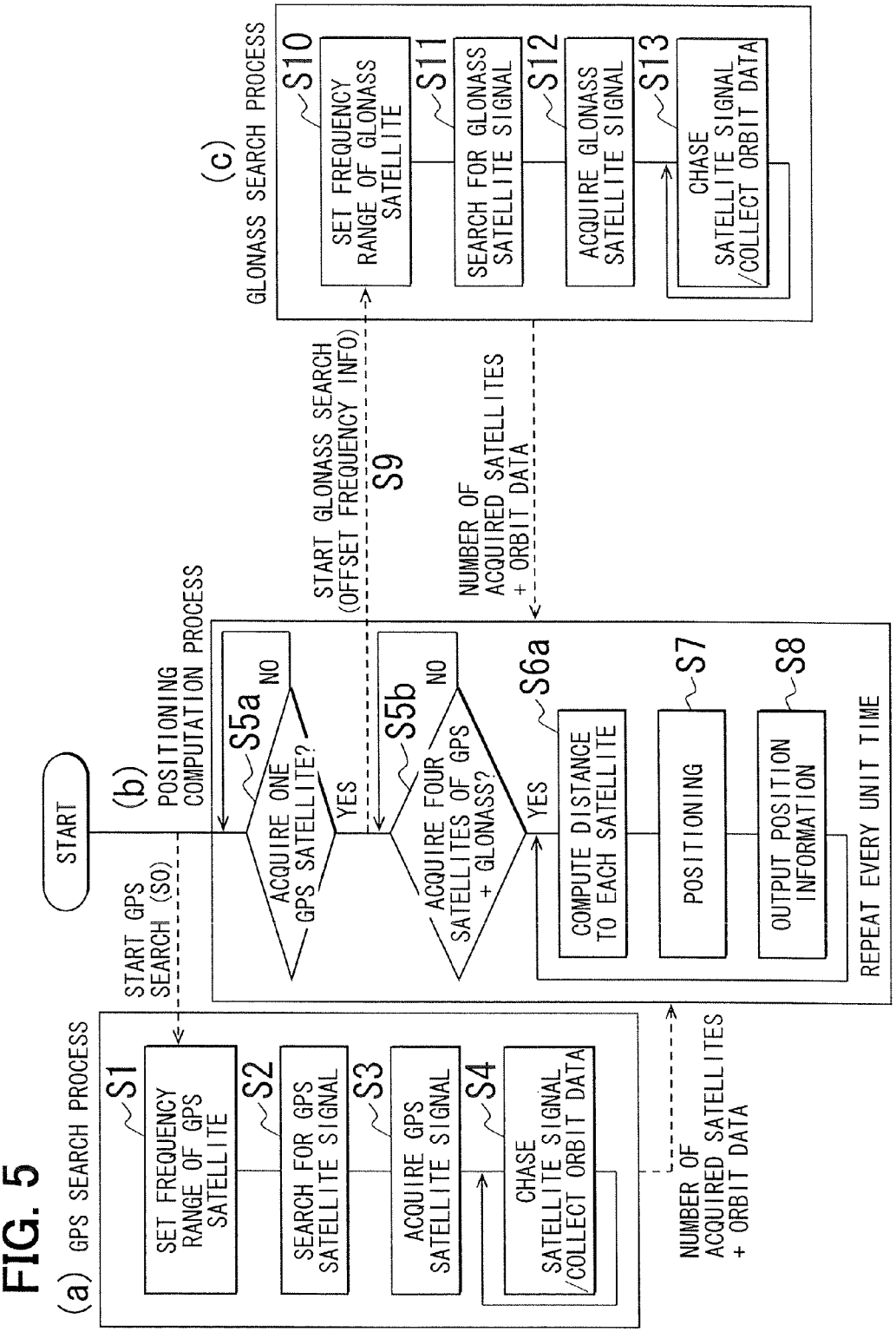
FIG. 5 is a flowchart schematically illustrating an operation taking place when a determined position of the positioning apparatus can be understood.

Next, an operation is explained with reference to FIGS. 4 and 5. FIGS. 4(a) to 4(c) indicate by using flowcharts roughly a process by the GPS function, a positioning computation process, and a process by the GLONASS function, when the determined position of the positioning apparatus itself cannot be understood. The processes are executed mainly by the positioning computation section 5a of the control section 5.

It is noted that a flowchart or the processing of the flowchart in the present application includes sections (also referred to as steps), which are represented, for instance, as S1. Further, each section can be divided into several sub-sections while several sections can be combined into a single section. Furthermore, each of thus configured sections can be referred to as a means and achieved not only as a software section but also as a hardware section.

In FIG. 4(a), when a search by the GPS function is started (S0), a search frequency range of the GPS satellite 6 is set (S1). This search frequency range is represented by the following formula (3).

$$\text{Search frequency range} = (\text{reference frequency} + \text{offset frequency}) \times \text{fixed value } N + \alpha \pm \beta \quad (3)$$

Herein, $\alpha$ represents an offset of a search frequency while $\pm\beta$ represents a frequency width of a search. Herein, $\alpha \pm \beta$ is set such that the left side of the formula (1) and the left side of the formula (2) can be contained in the search frequency range. It is noted that in a stage where any one of the GPS satellites 6 is not acquired, all of $\text{Dop}_{sate}$, $\text{Dop}_{rec}$, and the offset frequency cannot be understood. In considering especially such a situation, $\alpha \pm \beta$ is designated such that a frequency width is greater. In considering a velocity of the GPS satellite 6, a maximum moving velocity of the positioning apparatus 1, and a specification of the oscillator such as the local oscillator 3, it is empirically understood that the range exists such as $\text{Dop}_{sate}=\pm 20$ [kHz], $\text{Dop}_{rec}\pm 1$ [kHz], and offset frequency=±490 [Hz]. Therefore, the relation of the following formula (4) is effectuated.

$$(1575.42[\text{MHz}] \pm 20[\text{kHz}] \pm 1[\text{kHz}]) = (16.368[\text{MHz}] \pm 490[\text{Hz}]) \times 96 + \alpha \pm \beta \quad (4)$$

Thus, α=4.092 [MHz] and β≈47 [kHz] are set. Search for a GPS satellite signal is then executed (S2). When a GPS satellite signal is acquired as a result of executing a search of a GPS satellite signal, a GPS satellite signal is chased and orbit data is collected (S3). A collection process of the orbit data is repeated (S4).

FIG. 4(b) illustrates a positioning computation process. As indicated in FIG. 4(b), in the positioning computation process, on the condition that the number of acquired satellites and the orbit data are given and four GPS satellites 6 are acquired, the process of S6 to S8 is executed (S5: YES). At S6 to S8, distances to the GPS satellites 6 are computed (S6); the data is demodulated to compute a positioning and, based on the above-mentioned formula (2), an offset frequency is computed (S7); the position information is outputted (S8). The process S6 to S8 is repeated for every unit time. In the present embodiment, based on the offset frequency computed at S7, a satellite signal of the GLONASS satellite 7 is thus tried to be acquired.

FIG. 4(c) indicates a search process by the GLONASS function. When a search by the GLONASS function is started (S9), the search frequency range of the GLONASS satellite is set (S10).

The case where an offset frequency is computed to be 164 [Hz] is taken into consideration. A search frequency of a predetermined channel of the GLONASS satellite signal is set to 1602 [MHz]. When carrying out a down conversion by 98 multiplication of the reference frequency, the following formula (5) is effectuated.

$$(1602[MHz] \pm 20[kHz] \pm 1[kHz]) = (16.368[MHz] \pm 164[Hz]) \times 98 + \alpha \pm \beta \quad (5)$$

The value of $Dop_{sate}$ differs between each satellite and the value of $Dop_{rec}$ also differs depending on the state of the positioning apparatus 1. It is desirable that these values are set within a possible range. On the assumption of the value identical to the above-mentioned, the computation of the formula (5) is executed; thereby, α≈2.08 [MHz] and β=21 [kHz] are obtained. That is, it turns out that the search frequency range of the GLONASS satellite signal can be narrowed by computing the offset frequency previously as 164 [Hz].

The satellite signal of the GLONASS satellite 7 is searched for in the state where such set-up is made (S11). The GLONASS satellite signal is acquired (S12), and the satellite signal of the GLONASS satellite 7 is chased to collect orbit data (S13). The process of S13 is repeated.

If the offset frequency of the crystal oscillator 3a is not set before performing the search process of FIG. 4(c), it becomes difficult to set an accurate carrier frequency. A risk may thus arise that mistakenly retrieves an adjacent channel. That is, this leads to an erroneous recognition of a channel setup of the GLONASS satellite 7. In the present embodiment, the offset frequency is computed based on a positioning result when the positioning is executed by the GPS function; thereby, the satellite signal is retrieved by the GLONASS function. This prevents an adjacent channel from being mistakenly retrieved. That is, the erroneous recognition of the channel setup is prevented. Without mistaking the set channel of the FDMA, the number of the GLONASS satellite 7 is acquirable.

FIGS. 5(a) to 5(c) indicate by using flowcharts roughly a process by the GPS function, a positioning computation process, and a process by the GLONASS function, when the determined position of the positioning apparatus itself can be understood. The processes are executed by the positioning computation section 5a of the control section 5. A different part from FIGS. 4(a) to 4(c) is explained by assigning a different step number or a similar step number. FIG. 5(a) indicates a search process of the GPS function. As illustrated in FIG. 5(a), when the search by the GPS function is started (S0), the frequency range of the GPS function is set (S1) and a GPS satellite signal is searched for (S2). Next, a GPS satellite signal is acquired (S3). While the GPS satellite signal is chased, orbit data is collected (S4). The number of acquired satellites and the orbit data are outputted.

FIG. 5(b) indicates a positioning computation process. As illustrated in FIG. 5(b), it is determined whether the GPS satellite signal corresponding to one satellite (S5a) is acquired. If the signal corresponding to one satellite can be acquired (S5a: YES), offset information is computed from the present position information, and the satellite position information or satellite velocity on GPS satellite 6 (information included in the acquired satellite signal). The offset information is given to the GLONASS search process; thereby, the GLONASS search process shown in FIG. 5(c) is started.

In contrast, in the GLONASS search process, when the offset information is given, the frequency range of the GLONASS satellite 7 is set (S10). Several oscillated frequencies are switched therebetween to search for a GLONASS satellite signal (S11). When a GLONASS satellite signal is acquired (S12), the GPS satellite signal is chased and orbit data is collected (S13). The process of chasing of the satellite signal while collecting of the orbit data is repeated, thereby acquiring the necessary satellites and orbit data, which are given to the positioning computation process.

In contrast, in the positioning computation process, it is determined whether the total of the acquired GPS satellite 6 and the acquired GLONASS satellite 7 becomes four satellites (S5b). On the condition that four or more satellites are acquired (S5b: YES), each distance to each satellite is computed (S6a). The positioning is carried out (S7). The position information is outputted (S8). The process of S6a to S8 is repeated for every unit time. The position information is outputted continuously.

By executing the process in such a flowchart, the search process of the GPS satellite 6, the search process of the GLONASS satellite 7, and the positioning computation process can be executed. While taking into consideration the offset information of the crystal oscillator 3a, the GLONASS satellite 7 can be searched for and acquired. The erroneous recognition of the channel setup is thus prevented. Without mistaking the set channel of the FDMA, the number of the GLONASS satellite 7 is acquirable.

The present embodiment operates as follows. A satellite signal is received from a GPS satellite 6. A satellite signal is demodulated to execute a positioning using the oscillated frequency which the local oscillator 3 is caused to oscillate by the GPS function. A satellite signal is received from the GLONASS satellite 7 by the GLONASS function. The satellite signal is demodulated to execute a positioning by using an oscillated frequency the local oscillator 3 oscillates. In the above state, an offset frequency is calculated based on position information which is positioned, satellite position information acquired from a satellite signal of the GPS satellite 6, and a velocity vector of the GPS satellite 6; the GLONASS function is operated based on the offset frequency, performing a positioning using the GPS function and the GLONASS function. Thus, the deviation comes to be compensated even if the deviation occurs in the oscillating frequency of the local oscillator 3. Both the GPS function and the GLONASS function operate favorable. Under this configuration, even when a positioning apparatus shares a local oscillator between a GPS function and a GLONASS function, the positioning function can be achieved favorably.

Moreover, the crystal oscillator 3a is applied as a transmission source which oscillates a reference frequency used as the reference of the oscillated frequency of the local oscillator 3; the cost is reduced as compared with a configuration including a temperature compensated crystal oscillator.

Moreover, when an own determined position cannot be understood, satellite signals of four GPS satellite 6 by the GPS function to execute a positioning, an offset frequency is calculated based on a result of the positioning, and a GLONASS satellite signal is acquired based on the offset frequency. Thus, when a positioning apparatus shares a local oscillator between the GPS function and the GLONASS function, the positioning function is improved.

Moreover, when the own determined position can be understood, the satellite signal of one satellite is acquired from a GPS satellite by the GPS function, an offset frequency is calculated based on a result of the acquisition; a GLONASS satellite signal is acquired based on the offset frequency. Thus, when a positioning apparatus shares a local oscillator between a GPS function and a GLONASS function, the positioning function is improved.

Further, the GPS function is applied to the positioning in the first region where the buildings are not dense in a usual case; the GLONASS function is applied to the positioning in a predetermined second region where high buildings are dense, such as a center of a city. The suitable positioning method is applicable for every region.

Second Embodiment

Figure 6:
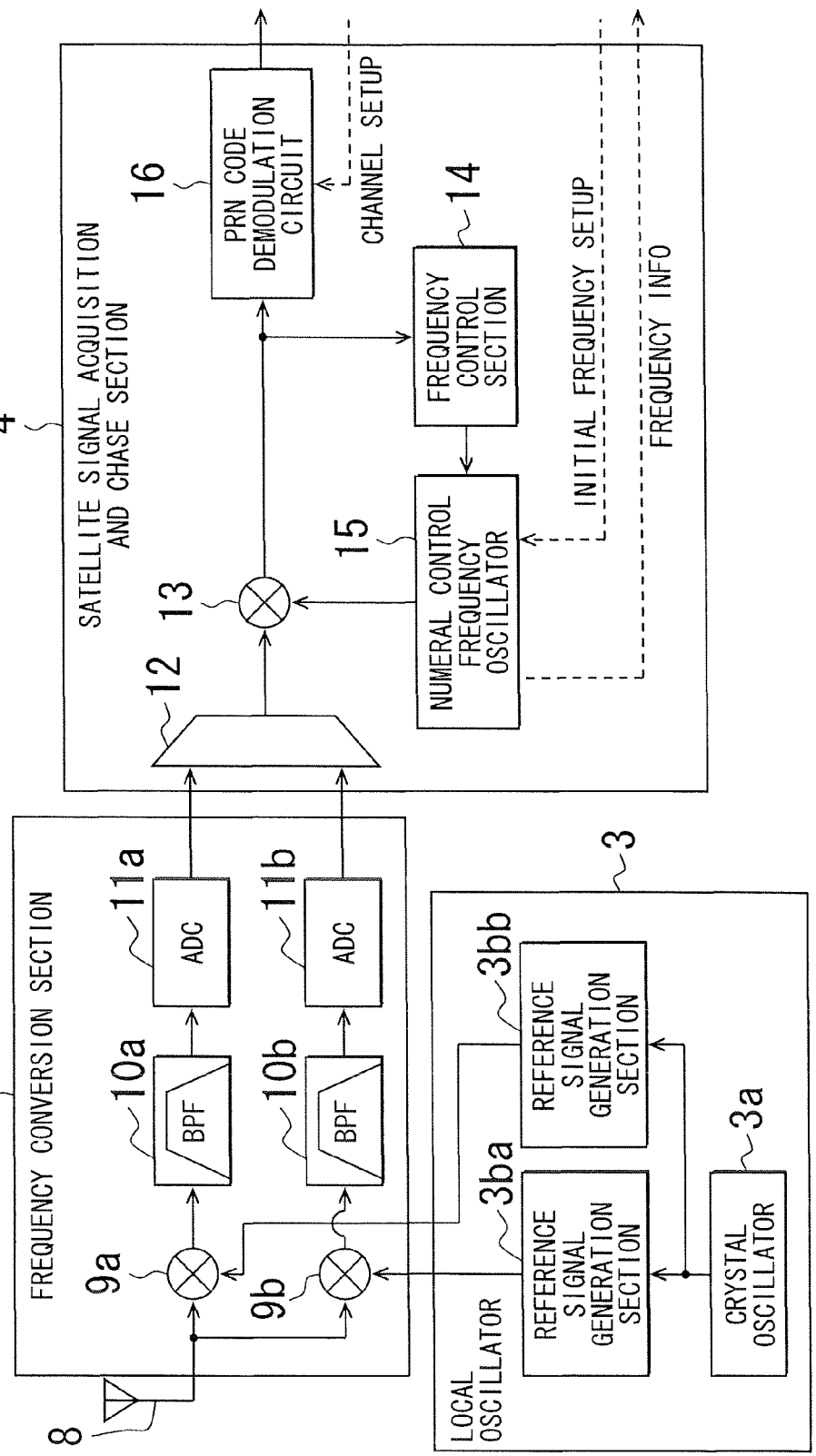
FIG. 6 is a diagram, which is equivalent to FIG. 2 and illustrates a second embodiment of the present invention.

FIG. 6 indicates a second embodiment of the present invention. A different part from the above-mentioned embodiment is in that a GPS satellite signal and a GLONASS satellite signal are received via different mixers. Identical reference numbers are assigned to the same part as those of the above-mentioned embodiment, explanation is omitted, and a different part is explained hereafter.

As indicated in FIG. 6, mixers 9a, 9b are provided as substitute for the mixer 9. The down conversion of the GPS satellite signal is carried out by the mixer 9a, and the band pass filter 10a carries out the band pass of the signal component. Further, the down conversion of the GLONASS satellite signal is carried out by the mixer 9b, and the band pass filter 10b carries out the band pass of the signal component. The outputs of reference frequency generation sections 3ba, 3bb are given to the mixers 9a, 9b, respectively. The reference frequency generation sections 3ba, 3bb output signals of oscillated frequencies different from each other. Also in the present embodiment, the almost same effect as that of the above-mentioned can be obtained.

Other Embodiments

The present invention is not limited to the above embodiments; for example, a modification or an expansion indicated below is possible. After carrying out the down conversion of the GPS satellite signal and the GLONASS satellite signal by the mixer 9, an amplifier (not shown) is inserted in the middle of a signal route. The insertion position may be arranged at any point between several blocks.

The above embodiments indicate a configuration to use as a reference signal generation section 3b a crystal oscillator (XO) to which the temperature compensation is not applied. However, a configuration may use a temperature compensated crystal oscillator (TCXO). When a temperature compensated crystal oscillator (TCXO) is applied, a frequency deviation can be suppressed to ±5 [ppm]; thereby, a stability of a frequency can be made high. Further, while being able to shorten a search time of a GPS satellite 6, an erroneous recognition of a channel of a GLONASS satellite 7 can be restricted.

Each or any combination of processes, functions, sections, steps, or means explained in the above can be achieved as a software section or unit (e.g., subroutine) and/or a hardware section or unit (e.g., circuit or integrated circuit), including or not including a function of a related device; furthermore, the hardware section or unit can be constructed inside of a microcomputer.

Furthermore, the software section or unit or any combinations of multiple software sections or units can be included in a software program, which can be contained in a non-transitory computer-readable storage media or can be downloaded via a communications network and then stored in a non-transitory computer-readable storage media.

(Aspects)

Aspects of the disclosure described herein are set out in the following clauses.

As an aspect of the disclosure, a positioning apparatus is provided as follows. The apparatus has a GPS function receiving a satellite signal from a GPS satellite and a GLONASS function receiving a satellite signal from a GLONASS satellite. A local oscillator is included which generates an oscillated frequency, wherein the GPS function demodulates the satellite signal with the oscillated frequency to execute a positioning, and the GLONASS function demodulates the satellite signal with the oscillated frequency to execute a positioning. A positioning computation section is included which computes an offset frequency of the local oscillator based on position information which is positioned, satellite position information acquired from a satellite signal of a GPS satellite, and a velocity vector of a GPS satellite, causes the GLONASS function to operate based on the offset frequency, and executes a positioning using the GPS function and the GLONASS function.

As an optional aspect of the disclosure, the local oscillator is included as a transmission source oscillating a reference frequency, thereby being configured to be cheap as compared with a configuration including a temperature compensated crystal oscillator.

As an optional aspect of the disclosure, when a determined position of the positioning apparatus cannot be understood, satellite signals are acquired from four GPS satellites using the GPS function to thereby perform a positioning. An offset frequency is calculated based on a result of the positioning; a GLONASS satellite signal is acquired based on the offset frequency. Thus, when a positioning apparatus shares a local oscillator between a GPS function and a GLONASS function, the positioning function is improved.

As an optional aspect of the disclosure, when a determined position of the positioning apparatus can be understood, satellite signals are acquired from one GPS satellite using the GPS function to thereby perform a positioning. An offset frequency is calculated based on a result of the acquisition; a GLONASS satellite signal is acquired based on the offset frequency. Thus, when a positioning apparatus shares a local oscillator between a GPS function and a GLONASS function, the positioning function is improved.

As an optional aspect of the disclosure, the GPS function is applied to the positioning in a usual case in a first region where buildings are not dense; the GLONASS function is applied to the positioning in a predetermined second region where high buildings are dense, such as a center of a city. The suitable positioning method is applicable for every region.

It will be obvious to those skilled in the art that various changes may be made in the above-described embodiments of the present invention. However, the scope of the present invention should be determined by the following claims.

What is claimed:

1. A positioning apparatus having a GPS function receiving a satellite signal from a GPS satellite and a GLONASS function receiving a satellite signal from a GLONASS satellite, the positioning apparatus comprising:
    a local oscillator that includes a crystal oscillator, the local oscillator generating an oscillation frequency using the crystal oscillator, wherein the GPS function demodulates the satellite signal with the oscillation frequency to execute a positioning, and the GLONASS function demodulates the satellite signal with the oscillation frequency to execute a positioning; and
    a positioning computation section
        configured to compute an offset frequency relative to a reference frequency of the crystal oscillator based on position information, satellite position information acquired from a satellite signal of a GPS satellite, and a velocity vector acquired from a satellite signal of a GPS satellite,
        configured to acquire a satellite signal from the GLONASS satellite using the oscillation frequency of the local oscillator, the oscillation frequency being generated based on (i) the reference frequency and (ii) the computed offset frequency, and
        configured to execute a positioning using the GPS function and the GLONASS function.

2. The positioning apparatus according to claim 1, wherein when the positioning computation section is not able to identify/calculate a determined position of the positioning apparatus, the positioning computation section
    acquires satellite signals from four GPS satellites using the GPS function to execute a positioning,
    computes an offset frequency based on a result of the positioning, and
    acquires a GLONASS satellite signal based on the offset frequency.

3. The positioning apparatus according to claim 1, wherein when the positioning computation section is able to identify/calculate a determined position of the positioning apparatus, the positioning computation section
    acquires a satellite signal from one GPS satellite using the GPS function,
    computes an offset frequency based on a result of acquiring, and
    acquires a GLONASS satellite signal based on the offset frequency.

4. The positioning apparatus according to claim 1, wherein the positioning computation section
    executes a positioning by applying the GPS function in a first region determined by a first set condition, and
    executes a positioning by applying both the GPS function and the GLONASS in a predetermined second region defined by a second set condition.

* * * * *